(12) United States Patent
Matsuoka

(10) Patent No.: US 12,533,835 B2
(45) Date of Patent: Jan. 27, 2026

(54) METHOD FOR MANUFACTURING INJECTION-MOLDED BODY

(71) Applicant: KANEKA CORPORATION, Osaka (JP)

(72) Inventor: Yoshiaki Matsuoka, Settsu (JP)

(73) Assignee: KANEKA CORPORATION, Osaka (JP)

(*) Notice: Subject to any disclaimer, the term of this patent is extended or adjusted under 35 U.S.C. 154(b) by 163 days.

(21) Appl. No.: 18/695,049

(22) PCT Filed: Sep. 21, 2022

(86) PCT No.: PCT/JP2022/035115
§ 371 (c)(1),
(2) Date: Mar. 25, 2024

(87) PCT Pub. No.: WO2023/054097
PCT Pub. Date: Apr. 6, 2023

(65) Prior Publication Data
US 2024/0391145 A1   Nov. 28, 2024

(30) Foreign Application Priority Data
Sep. 29, 2021   (JP) .................... 2021-159951

(51) Int. Cl.
*B29C 45/00* (2006.01)
*B29C 45/34* (2006.01)
(Continued)

(52) U.S. Cl.
CPC ...... *B29C 45/0025* (2013.01); *B29C 45/0001* (2013.01); *B29C 45/0013* (2013.01);
(Continued)

(58) Field of Classification Search
CPC .... B29C 2045/0027; B29C 2045/0032; B29C 2045/0034; B29C 2045/0037;
(Continued)

(56) References Cited

U.S. PATENT DOCUMENTS

2016/0251494 A1   9/2016  Koyama et al.
2022/0258387 A1   8/2022  Katsuta et al.

FOREIGN PATENT DOCUMENTS

JP  2005-324529 A   11/2005
JP  2021-20431 A    2/2021
(Continued)

OTHER PUBLICATIONS

International Search Report issued Dec. 20, 2022, in PCT/JP2022/035115 (with English Translation), 4 pages.
(Continued)

*Primary Examiner* — Stella K Yi
(74) *Attorney, Agent, or Firm* — Oblon, McClelland, Maier & Neustadt, L.L.P.

(57) ABSTRACT

This invention has an object to provide a method for manufacturing an injection-molded product of a resin composition containing a P3HA-based resin, the method enabling stable continuous production without generating flash. This object is attained by the method for manufacturing, with use of a mold apparatus, the injection-molded product of the resin composition containing the P3HA-based resin, the method including the step of: before filling a mold with the resin composition by injection, carrying out pressure reduction by reducing a gage pressure inside a cavity of the mold so as to be not more than −0.02 MPa, the mold apparatus including the mold which has a parting line being in contact with the cavity in the mold and having a maximum width which is not more than 50 μm when the mold is closed.

20 Claims, 5 Drawing Sheets

(51) Int. Cl.
   *B29K 105/00*    (2006.01)
   *B29K 105/16*    (2006.01)
(52) U.S. Cl.
   CPC ...... *B29C 45/34* (2013.01); *B29C 2045/0034* (2013.01); *B29K 2105/0085* (2013.01); *B29K 2105/16* (2013.01)
(58) Field of Classification Search
   CPC ........ B29C 2045/0043; B29C 45/0001; B29C 45/0003; B29C 45/0005; B29C 45/0013; B29C 45/0025; B29C 45/0046; B29C 45/0062; B29C 45/34
   See application file for complete search history.

(56) References Cited

FOREIGN PATENT DOCUMENTS

| WO | WO 2013/047289 A1 | 4/2013 |
| WO | WO 2015/052876 A1 | 4/2015 |
| WO | WO 2021/010054 A1 | 1/2021 |

OTHER PUBLICATIONS

International Preliminary Report on Patentability and Written Opinion issued Apr. 2, 2024, in PCT/JP2022/035115 (with English Translation), 7 pages.

METHOD FOR MANUFACTURING INJECTION-MOLDED BODY

CROSS-REFERENCE TO RELATED APPLICATIONS

The present application is a 35 U.S.C. § 371 national stage patent application of International patent application PCT/JP2022/035115, filed on Sep. 21, 2022, which is based on and claims the benefits of priority to Japanese Application No. 2021-159951, filed on Sep. 29, 2021. The entire contents of all of the above applications are incorporated herein by reference.

TECHNICAL FIELD

The present invention relates to a method for manufacturing, with use of a mold apparatus, an injection-molded product of a resin composition containing a poly(3-hydroxyalkanoate)-based resin (hereinafter, which may be referred to as "P3HA-based resin" occasionally).

BACKGROUND ART

In recent years, environmental problems caused by plastic wastes have attracted attention. In particular, it has been learned that large amounts of plastics, being dumped to the ocean or flowing through rivers, flow and drift on the ocean on a global scale. Such plastics remain in shape for a long period of time; therefore, these plastics can cause so-called ghost fishing, which refers to the restraint or capture of marine organisms with drifting plastics. Furthermore, if the plastics are ingested by marine organisms, the plastics remain in digestive systems of the marine organisms, which causes eating disorders. Therefore, it has been pointed out that such plastics can affect ecosystems.

In addition, the following problems have also been pointed out. That is, by ultraviolet light and/or the like, the plastics are disintegrated and micronized into microplastics, which adsorb hazardous compounds in the oceans. Then, marine organisms ingest these microplastics, resulting in incorporation of hazardous substances into the food chain.

To cope with marine pollution caused by the plastics, use of biodegradable plastics is expected. However, a report compiled by the United Nations Environment Program in 2015 pointed out that compost-biodegradable plastics such as polylactic acid cannot be a measure against marine pollution because they cannot be expected to be decomposed within short periods of time in a low-temperature real ocean.

Under these circumstances, P3HA-based resins are attracting attention as a material capable of solving these problems because the P3HA-based resins are a material that can be biodegraded even in seawater.

For example, Patent Literature 1 discloses a method for manufacturing an injection-molded product from a molding material containing a poly(3-hydroxybutyrate)-based resin, the molding material having a difference of not less than 10° C. and not less than 70° C. between a melting point peak temperature and a melting point peak end temperature as measured by differential scanning calorific value analysis. This method includes the steps of: heating the molding material at a temperature that is between the melting point peak and the melting point peak end temperature so as to melt the molding material and injecting the molding material into a mold having a temperature ranging from 30° C. to 80° C.; and cooling the molding material in the mold to crystallize and solidify the molding material.

Patent Literature 2 discloses a mold apparatus for use in injection molding of a biodegradable resin containing poly(3-hydroxyalkanoate). The mold apparatus includes: a hot runner that heats and melts the biodegradable resin; a plurality of cavities which are to be filled with, by injection, the molten resin heated and melted by the hot runner; and gates that provide communication between the hot runner and the cavities. The plurality of cavities are identical in flow length of the biodegradable resin from a position of each gate, serving as a reference point, to a filling end position in the cavity.

CITATION LIST

Patent Literature

Patent Literature 1

International Publication No. WO 2021/010054

Patent Literature 2

Japanese Patent Application Publication Tokukai No. 2021-020431

SUMMARY OF INVENTION

Technical Problem

Although the foregoing are excellent techniques, even if these techniques were combined to each other, it would be difficult to completely satisfy the demand for flash reduction; this would be insufficient for stable production.

Thus, the present invention has an object to provide a method for manufacturing an injection-molded product of a resin composition containing a P3HA-based resin, the method making it possible to carry out stable continuous production without generating flash.

Solution to Problem

As a result of conducting diligent studies in order to attain the above object, the inventors of the present invention discovered for the first time that manufacturing an injection-molded product by using a specific mold and reducing a pressure inside the mold at the time of injection makes it possible to carry out continuous production for a long term without generating flash. Then, the inventors of the present invention completed the present invention.

Thus, an aspect of the present invention is a method (hereinafter, referred to as "the present manufacturing method") for manufacturing, with use of a mold apparatus, an injection-molded product of a resin composition containing a P3HA-based resin, the mold apparatus including a mold which has a parting line being in contact with a cavity in the mold and having a maximum width which is not more than 50 μm when the mold is closed, the method including the step of: before filling the mold with the resin composition by injection, carrying out pressure reduction by reducing a gage pressure inside the cavity of the mold so as to be not more than −0.02 MPa.

Advantageous Effects of Invention

Thus, an aspect of the present invention makes it possible to carry out, in manufacturing an injection-molded product of a resin composition containing a P3HA-based resin, stable continuous production without generating flash.

DESCRIPTION OF EMBODIMENTS

Figure 1:
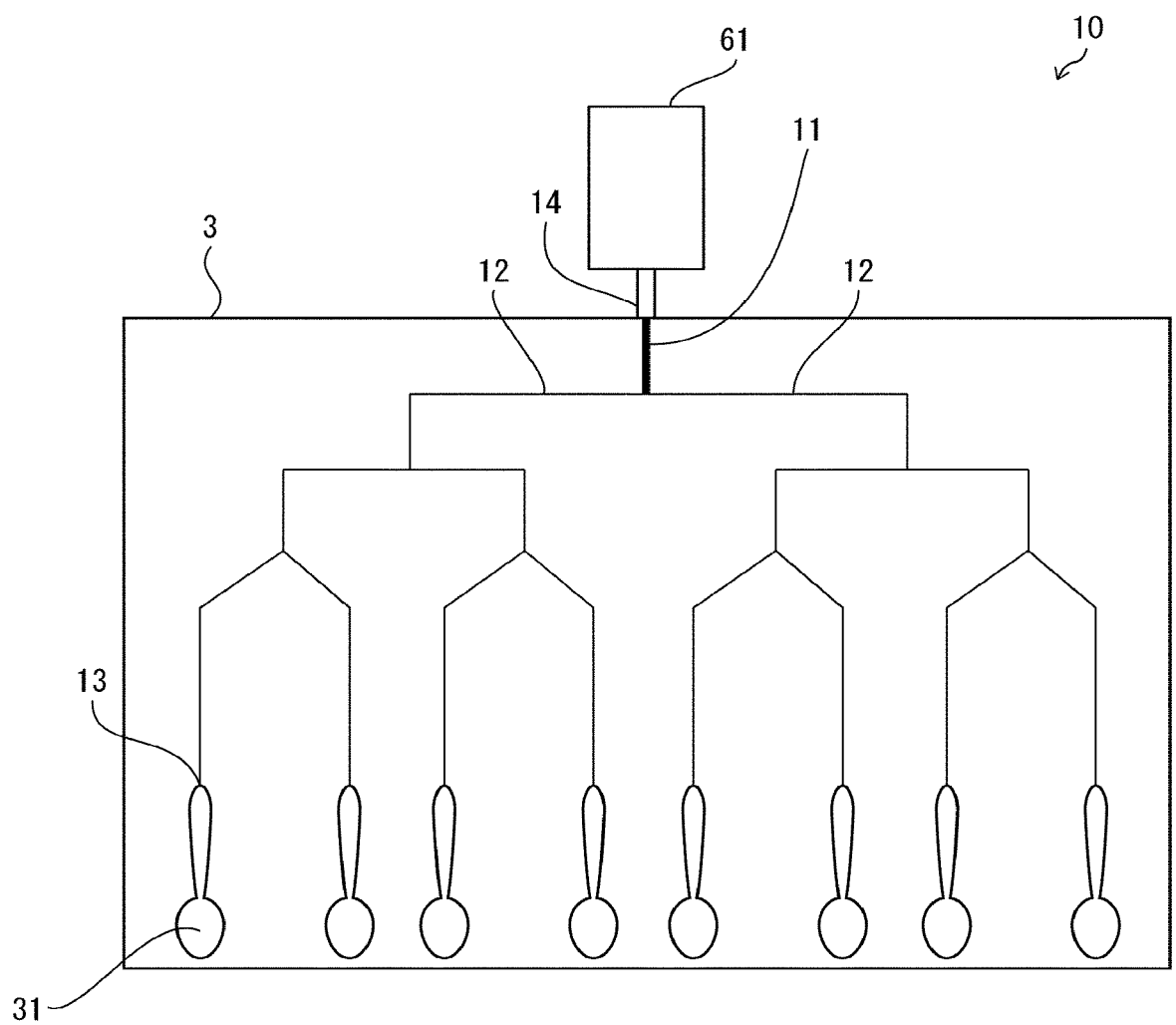
FIG. 1 is a view schematically illustrating an overview of a mold apparatus in accordance with an embodiment of the present invention.

The following will provide details of an embodiment of the present invention. Any numerical range expressed as "A to B" in the present specification means "not less than A and not more than B", unless otherwise specified. All literatures listed herein are incorporated herein by reference.

[1. Overview of the Present Invention]

As discussed above, P3HA-based resins are a material that can be biodegraded even in seawater. Thus, the P3HA-based resins are attracting attention as a material capable of solving the above-described problems of marine pollution caused by plastics. However, since the P3HA-based resins have a slow solidification rate, it is difficult to process the P3HA-based resins by molding. Further, particularly in injection molding, it is difficult to balance flash and sink.

While advancing the study on manufacturing of an injection-molded product by using the P3HA-based resins, the inventors of the present invention have found the following problem. That is, the P3HA-based resins are more prone to generate flash than other resins and have poor continuous productivity.

Therefore, as a result of conducting diligent studies to attain the above-described object, the inventors of the present invention have found that, by setting a maximum width (maximum gap) of a parting line of a mold so as to be not more than a predetermined value, it is possible to reduce generation of flash. However, setting the maximum width of the parting line so as to be not more than the predetermined value causes the following new problem. That is, due to a resin decomposition gas generated in a cavity, a phenomenon (shortshot) that an injected resin composition does not reach a deepest part of the cavity occurs, resulting in reduction in continuous productivity. In order to deal with this, the inventors of the present invention conducted further studies, and found that reducing a gage pressure inside the cavity so as to be not more than a predetermined value can solve the shortshot problem and can enhance continuous productivity without generating flash in an injection-molded product.

For manufacturing an injection-molded product of a P3HA-based resin, conventional techniques have studied conditions such as a melting point peak temperature of the resin, which is a raw material, and a flow length of the resin.

In contrast, the inventors of the present invention found the new problem of the shortshot generated in the process of manufacturing an injection-molded product of a P3HA-based resin. Then, the inventors of the present invention focused on, especially, the structure of the mold and the conditions inside the mold. As a result, the inventors of the present invention succeeded in manufacturing, by continuous production, an injection-molded product with less flash.

According to the present invention, it is possible to carry out stable continuous production without generating flash. Therefore, the present invention is quite useful in manufacturing an injection-molded product by using a P3HA-based resin. It should be noted that the expression "not generating flash" herein encompasses not only an aspect in which no flash is generated at all but also an aspect in which generation of flash is reduced. For example, an aspect in which a maximum flash thickness, measured in flash thickness measurement in the examples of the present invention, is not more than 80 μm is encompassed in a range described by the expression "not generating flash".

Furthermore, the configuration described above makes it possible to reduce marine pollution caused by wastes. This enables the present invention to contribute to achievement of sustainable development goals (SDGs) such as Goal 12 "Ensure sustainable consumption and production patterns" and Goal 14 "Conserve and sustainably use the oceans, seas and marine resources for sustainable development". The following description will discuss details of the present manufacturing method.

[2. Method for Manufacturing Injection-Molded Product]

The present manufacturing method is a method for manufacturing, with use of a mold apparatus, an injection-molded product of a resin composition containing a P3HA-based resin, the mold apparatus including a mold which has a parting line being in contact with a cavity in the mold and having a maximum width which is not more than 50 μm when the mold is closed, the method including the step of: before filling the mold with the resin composition by injection, carrying out pressure reduction by reducing a gage pressure inside the cavity of the mold so as to be not more than −0.02 MPa.

The "parting line being in contact with a cavity in a mold" herein means a gap in an interface between pieces of the mold, the gap being generated when the mold is closed. That is, the "parting line being in contact with a cavity in a mold" does not exist when the mold is open but exists only when the mold is closed. The "parting line being in contact with a cavity in a mold" herein may simply be referred to as a "parting line" occasionally.

(Mold Apparatus)

The following description will discuss, with reference to FIG. 1, details of an embodiment of the mold apparatus for use in the present manufacturing method (hereinafter, such a mold apparatus may be referred to as "the present mold apparatus" occasionally). It should be noted that the mold apparatus shown in FIG. 1 is merely an example, and the mold apparatus used in the present manufacturing method is not limited to the one shown in FIG. 1.

FIG. 1 is a plan view schematically illustrating an overview of the present mold apparatus. As shown in FIG. 1, the mold apparatus 10 is constituted by an injection molding machine 61 and a mold 3. Further, the mold 3 includes a sprue 11, a runner 12, a gate 13, and one or more cavities 31.

A resin composition that is a raw material of the injection-molded product is injected, in a fluid state (molten state), from a nozzle 14 of the injection molding machine 61, so that the sprue 11 in the mold 3 is filled with the resin composition. Thereafter, the resin composition in a fluid state moves from the sprue 11 to pass through the runner 12, and is supplied into the cavity 31 via the gate 13. After the resin composition supplied into the cavity 31 hardens, the resin composition is cut at the gate 13, so as to be taken out from the mold 3 as an injection-molded product.

The sprue 11 is a component for delivering the resin composition to the runner 12. The runner 12 is a component that connects the sprue 11 and the gate 13 to each other. The runner 12 may be branched. In this case, the branched runner 12 can connect the sprue 11 to multiple gates 13 to each other. The runner 12 may be a hot runner or a cold runner. The gate 13 is an opening that provides communication between the runner 12 and the cavity 31.

Subsequently, the mold 3 of the present mold apparatus 10 will be described in detail with reference to FIGS. 2 and 3. It should be noted that the mold depicted in FIGS. 2 and 3 is merely an example, and the mold for use in the present manufacturing method is not limited to the one depicted in FIGS. 2 and 3.

Figure 2:
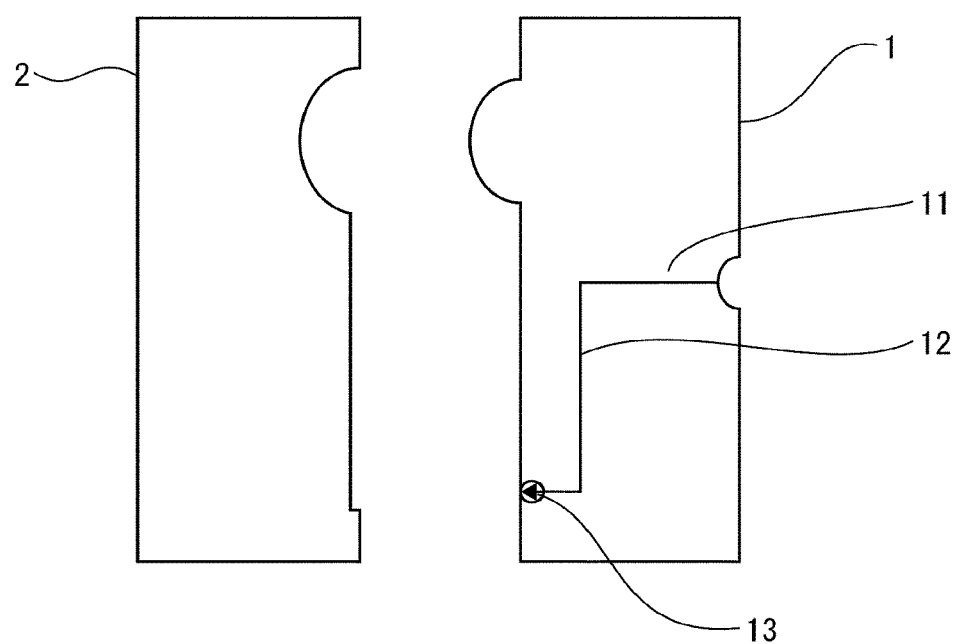
FIG. 2 is a view schematically illustrating an open state of the mold in accordance with the embodiment of the present invention.
Figure 3:
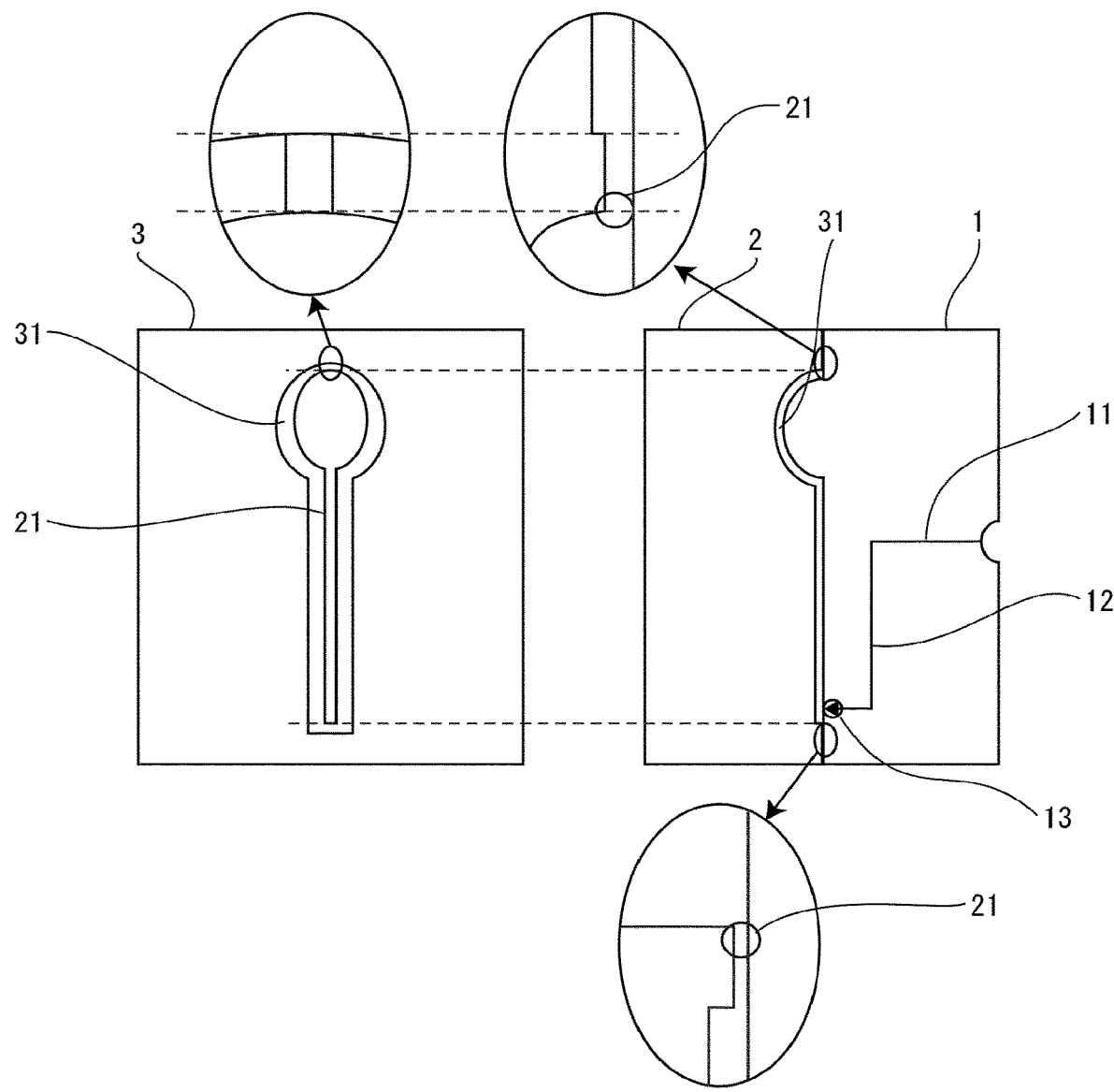
FIG. 3 is a view schematically illustrating a closed state of the mold in accordance with the embodiment of the present invention.

FIG. 2 is a cross-sectional view schematically illustrating an open state of the mold 3. FIG. 3 is a plan view and a cross-sectional view schematically illustrating a closed state of the mold 3. A mold portion of the mold 3 is constituted by a mold (protruding part) 1 and a mold (concave part) 2. The mold (protruding part) 1 includes a sprue 11, a runner 12, and a gate 13. The mold (concave part) 2 includes a cavity 31 into which the resin composition flows. Combining (i.e., closing) the mold (protruding part) 1 and the mold (concave part) 2 forms a parting line 21 at an interface between these mold parts.

The parting line 21 of the mold 3 (hereinafter, also referred to as "the present mold 3") constituting the present mold apparatus 10 has a maximum width (maximum gap) of not more than 50 µm, preferably not more than 30 µm, more preferably not more than 20 µm, even more preferably not more than 10 µm, and further preferably, there is substantially no gap (i.e., 0 µm). When the maximum width of the parting line 21 is greater than 50 µm as commonly used in conventional techniques, use of a P3HA-based resin in the present manufacturing method may cause the molten resin composition to be likely to leak out of the cavity 31. Thus, setting the maximum width of the parting line 21 so as to be not more than 50 µm reduces leakage of the resin composition to the outside of the cavity 31, thereby reducing flash in the resulting molded body.

There is no particular limitation on a shape of the cavity 31. It is preferable that the cavity 31 be in the shape suitable for molding multiple products. An injection-molded product to be molded by the cavity 31 is an injection-molded product to be discarded after use. Examples of such an injection-molded product may include a spoon, a fork, a knife, a muddler, a coffee capsule, a tray, a cup, a jar, a cable tie, a cap for a bottle, a cap for a pen, a pen, a clip for agricultural use, and a frame part of a fan. Among these, the injection-molded product is preferably a disposable molded product for food use. Examples of such a molded product may include a spoon, a fork, a knife, a muddler, a coffee capsule, a tray, and a cup. In addition, the injection-molded article is more preferably cutlery. Examples of the cutlery may include a spoon (e.g., a spoon molded by the cavity 31 illustrated in FIGS. 1 to 4), a fork, a knife, and a muddler. The injection-molded product can be preferably used in agriculture, fisheries, forestry, horticulture, medicine, hygiene products, clothing, non-clothing, packaging, and other fields.

As shown in FIG. 1, the present mold 3 preferably includes two or more cavities 31 that are identical in shape. The number of the cavities 31 may be not less than four, not less than eight, or not less than 16.

With the present mold apparatus 10 having multiple cavities 31 that are identical in shape, it is possible to manufacture a large number of injection-molded products of the same quality at once. Therefore, it is possible to carry out stable continuous production of the injection-molded product in a more efficient manner.

The present mold apparatus 10 is preferably configured so that distances from the tip of the nozzle 14 of the injection molding machine 61 to the respective cavities 31 are equal. Specifically, the mold apparatus 10 preferably has the shape as illustrated in FIG. 1, for example. It can be said that, in the mold apparatus 1 having the shape as illustrated in FIG. 1, the distances from the tip of the nozzle 14 of the injection molding machine 61 to the respective cavities 31 are equal. It should be noted that the injection molding apparatus depicted in FIG. 1 is merely an example, and the shape of the injection molding apparatus for use in the present manufacturing method is not limited to the one depicted in FIG. 1. For example, the shape of the runner 12 of the present mold 3 may be a shape having a depth (three-dimensional shape) besides the shape illustrated in FIG. 1. In a case where the runner 12 is in a shape having a depth, the shape of the runner 12 is preferably in a linear symmetrical shape (i.e., a shape having multiple identical shapes) centered on the injection molding machine 61, from the viewpoint of equalizing the above-mentioned distances.

In the present mold apparatus 10 configured as above, the distances from the nozzle 14 to the respective cavities 31 are equal, and therefore it is possible to fill the cavities 31 with the resin at an almost identical timing. Thus, it is possible to obtain more uniform products with less flash and sink, resulting in improved productivity.

In the present mold 3, the resin composition inside the sprue 11 and the runner 12 is preferably in a molten state (fluid state). Thus, the sprue 11 and the runner 12 are preferably heated to a temperature not less than the melting point of the resin composition by a heater, infrared rays, or the like. In other words, the resin composition is preferably supplied from the runner 12 into the cavity 31 in a molten state. Therefore, the runner 12 for use in the present manufacturing method is preferably a hot runner.

Given that the resin composition inside the sprue 11 and the runner 12 is in a molten state, it will be possible to equally supply the resin in all the cavities 31, and thus flash will be less likely to be generated in injection-molded products. In addition, wastes of the resin composition, which is a raw material, are hardly produced.

The gate 13 of the present mold 3 is preferably openable and closable. There is no particular limitation on a mechanism for opening and closing the gate 13. For example, the gate 13 may be opened and closed by a valve pin (not illustrated) provided inside the runner 12. In a case of the runner 12 provided with a valve pin, the valve pin is disposed in a flow passage of the resin composition in the runner 12. An outer diameter of a mold-side end of the valve pin is preferably formed almost identical to, or slightly smaller than an inner diameter of the gate 13.

Closing the gate 4 with the end of the valve pin prevents the resin composition from being discharged from the gate 13. It is preferable that the injection molding apparatus be provided with a mechanism for reciprocating the valve pin. In such a configuration, the valve pin is configured so as to move in a reciprocating motion vertically in the flow passage of the resin composition in the runner 12. The vertical reciprocating motion of the valve pin enables opening and closing of the gate 13.

Therefore, given that the gate 13 is configured to be openable and closable by the opening and closing mechanism such as a valve pin, the resin composition from the gate 13 can be favorably cut off when the discharge of the resin composition from the gate 13 is stopped. This makes it possible to more precisely control the discharge amount of the resin composition from the runner 12.

In the present mold 3, a value obtained by dividing a total volume of the sprue 11, the runner 12, and the gate or gates 13 by a total volume of the cavity or cavities 31 is preferably 0.5 to 5.0, more preferably 0.8 to 4.0, even more preferably 1.0 to 3.0, and particularly preferably 1.0 to 2.0.

The above configuration can shorten a residence time of the resin composition within the sprue 11 and the runner 12. A short residence time of the resin composition is likely to provide a uniform temperature, so that the resin composition is less prone to being subjected to pyrolysis. Thus, it is possible to obtain an injection-molded product with less flash. The "total volume of the cavity or cavities" can also be expressed as the "total volume of a product or products".

The present mold 3 preferably includes a pressure reducing portion 71. Via the pressure reducing portion 71, a gage pressure inside the cavity can be reduced so as to be not more than a predetermined value. A pressure reducing step in the present manufacturing method will be described later.

Figure 4:
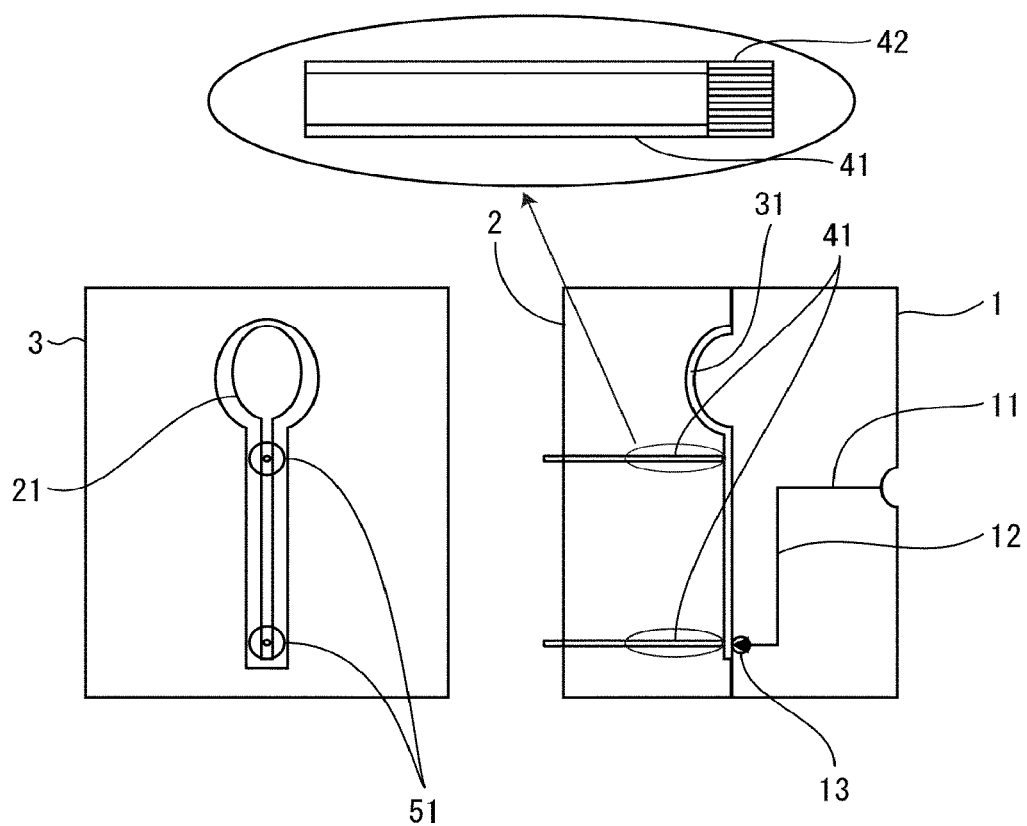
FIG. 4 is a view schematically illustrating a closed state of a mold provided with a vent portion having an opening of a slit-type structure in accordance with an embodiment of the present invention.

The present mold 3 preferably includes a vent portion 41. Further, since the maximum width of the parting line 21 of the present mold 3 is not more than 50 μm, the vent portion 41 is preferably provided at a position different from a position of the parting line 21. With the configuration in which the present mold 3 includes the vent portion 41 at the position different from the position of the parting line 21, it is possible to efficiently discharge a gas inside the cavity 31 to the outside. The following will describe details of the vent portion 41 with reference to FIG. 4. FIG. 4 is a plan view and a cross-sectional view schematically illustrating a closed state of the vent portion 41 of the present mold. The position of the vent portion 41 is not limited to the one depicted in FIG. 4, and may be any position in the present mold 3. Furthermore, there is no particular limitation on the number of the vent portion(s) 41. For example, the number of the vent portion(s) 41 may be one, two, three, four, or five or more.

The present mold 3 preferably has a mechanism for drawing out a gas from the vent portion 41. There is no particular limitation on the mechanism for drawing out a gas. It is preferable that the mechanism be a vacuum pump, since the vacuum pump has excellent sucking performance. Examples of the vacuum pump include a water-sealed vacuum pump and a dry roots-type vacuum pump.

The present mold 3 including, in addition to the pressure reducing portion 71, the vent portion 41 provided with the mechanism for drawing out a gas can more efficiently discharge a gas inside cavity 31 (i.e., carry out pressure reduction). This enhances productivity of the injection-molded product.

An opening of the vent portion 41 has a maximum width of 1 μm to 50 μm, preferably 2 μm to 40 μm, more preferably 3 μm to 30 μm, and even more preferably 3 μm to 15 μm. Setting the maximum width of the opening of the vent portion 41 so as to be not more than 50 μm provides the effect of drawing out a gas sufficiently and the effect of reducing flash. Further, setting the width of the vent portion so as to be not less than 1 μm makes it possible to discharge a gas inside the cavity 31 sufficiently.

Furthermore, the opening of the vent portion 41 may have a structure of at least one type selected from the group consisting of a slit type, a porous type, a nested type, and an opening/closing type. With the vent portion 41 having the opening of the above structure, it is possible to discharge a gas inside the cavity 31 easily.

Figure 5:
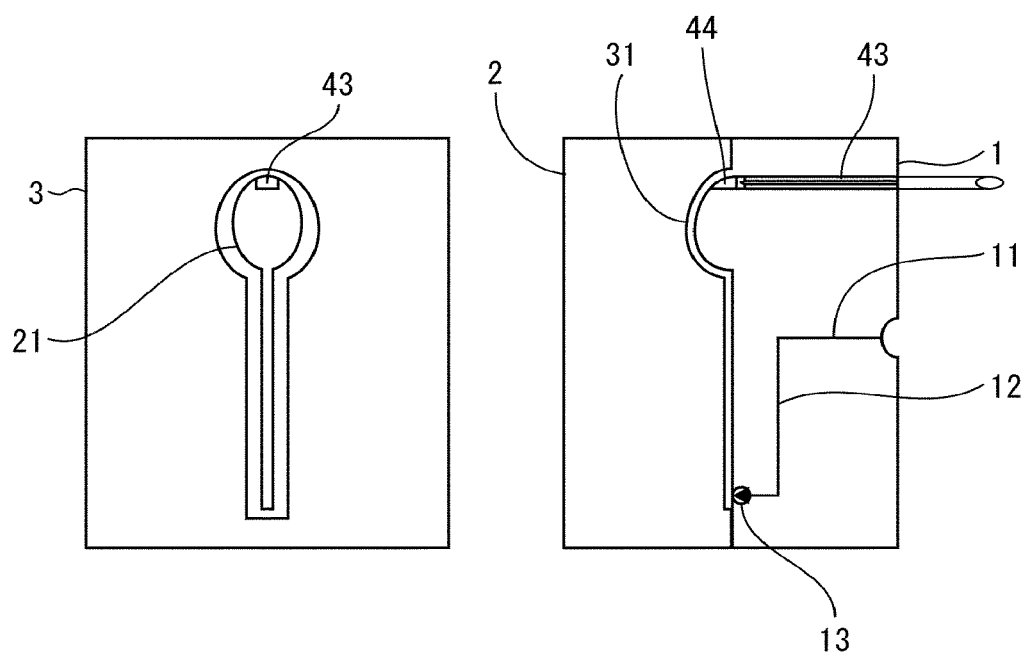
FIG. 5 is a view schematically illustrating a closed state of a mold provided with a vent portion having an opening of a nested-type structure in accordance with an embodiment of the present invention.

The slit type refers to a type according to which the cavity 31 has, on its surface, a slit 42 having a length of 1 μm to 50 μm and allows a gas to be discharged to the outside of the cavity 31 through the slit 42. An example of the slit-type structure is illustrated in FIG. 4. In a case where the vent portion 41 has a slit-type opening, the vent portion 41 includes, for example, a slit 42, as illustrated in FIG. 4. The porous type refers to a type that utilizes a porous substance whose pores are connected to each other so as to allow a gas to be ultimately discharged to the outside of the cavity 31. The nested type refers to a type according to which the cavity 31 is partially nested so as to allow a gas to be discharged from the cavity through a gap formed thereby. An example of the nested-type structure is depicted in FIG. 5. In a case where the vent portion 41 has a nested-type opening, the vent portion 41 includes, for example, a nested portion 43, as illustrated in FIG. 5. The gas inside the cavity 31 is discharged through the (nested type) opening 44 of the vent portion at which the nested portion 43 and the cavity 31 are in contact with each other. The opening/closing type refers to a type according to which, between a stage at which a molten resin is supplied into the cavity 31 and a stage at which the molten resin reaches the opening/closing portion, an opening/closing portion is open so as to allow a gas to be discharged to the outside of the cavity 31 and the opening and closing portion is closed just before the molten resin reaches the opening and closing portion. With the vent portion 41 of any type, the maximum width of the opening portion is preferably 1 μm to 50 μm.

In a case where multiple vent portions 41 are provided, the opening portions of the respective vent portions 41 may have identical maximum width or different maximum widths. The structures of the opening portions of the respective vent portions 41 may be obtained by combining two or more types.

The present mold 3 may further include a mechanism for taking out an injection-molded product from the cavity 31. Examples of such a mechanism include an ejection pin 51 illustrated in FIG. 4. In a case where the present mold 3 includes this mechanism, the vent portion 41 may be provided at the same position as that of the ejection pin 51.

(Pressure Reducing Step)

The present manufacturing method includes the step (pressure reducing step) of: before filling the mold with the resin composition by injection, carrying out pressure reduction by reducing the gage pressure inside the cavity of the mold so as to be not more than −0.02 MPa. The expression "before filling the mold with the resin composition by injection" is not limited to any particular timing, as long as the timing is before injecting the resin composition into the mold. Examples of the timing include: (1) a timing before injection of the resin composition; (2) a period between a timing immediately after starting injection of the resin composition and a timing at which the mold is filled with the resin composition; and (3) a period between a timing before injection of the resin composition and a timing at which the mold is filled with the resin composition. Preferably, the pressure reducing step is carried out before injection of the resin composition. Carrying out the pressure reducing step hardly causes the above-described shortshot even if the maximum width of the parting line is set so as to be not more than 50 µm. This enhances continuous productivity of the injection-molded product.

A method for reducing the gage pressure inside the cavity is not limited to any particular one. For example, the reduction of the gage pressure inside the cavity may be carried out with use of a machine such as a pump. The pressure reduction can be carried out via the ejection pin 51 in the cavity, the vent portion 41 in the cavity, the parting line 21 being in contact with the cavity in the mold, and/or the like. From the viewpoint of efficient pressure reduction, the pressure reduction is preferably carried out via the ejection pin 51 and the vent portion 41.

The "gage pressure" herein means a difference pressure between an atmospheric pressure (ordinary pressure) of an environment outside the cavity and an atmospheric pressure inside the cavity. That is, the expression "the gage pressure is −0.02 MPa" means that the atmospheric pressure inside the cavity is smaller than the atmospheric pressure outside the cavity by 0.02 MPa.

The gage pressure in the pressure reducing step is not more than −0.02 MPa, preferably not more than −0.03 MPa, and more preferably not more than −0.05 MPa. There is no particular limitation on a lower limit of the gage pressure. For example, the lower limit is not less than −0.1 MPa. In a case where the pressure reduction is carried out with use of the above-described pump, the lower limit of the gage pressure may be a limit value determined by the performance of the pump.

(P3HA-Based Resin)

The resin composition for use in the present manufacturing method includes a P3HA-based resin. As used herein, the "P3HA-based resin" means a biodegradable aliphatic polyester (preferably, polyester with no aromatic ring). The P3HA-based resin is a polyhydroxyalkanoate that contains a 3-hydroxyalkanoate repeating unit as a repeating unit, represented by the general formula [—CHR—CH$_2$—CO—O—] (where R is an alkyl group represented by C$_n$H$_{2n+1}$ and n is an integer of not less than 1 and not more than 15).

Further, the P3HA-based resin may contain at least one kind of copolymer of a 3HB unit and another hydroxyalkanoate unit. With respect to the total repeating units (100 mol %), the 3-hydroxybutyrate unit in the poly(3-hydroxyalkanoate)-based resin is preferably 94.5 mol % to 98.5 mol %, more preferably 95.0 mol % to 98.5 mol %, even more preferably 96.0 mol % to 98.5 mol %, and particularly preferably 96.5 mol % to 98.0 mol %.

The P3HA-based resin containing the 3HB repeating unit at a composition ratio of not less than 94.5 mol % tends to achieve improved rigidity, increased crystallization speed, decreased flash, and improved productivity. Meanwhile, the P3HA-based resin containing the 3HB repeating unit at a composition ratio of not more than 98.5 mol % achieves a melting point lower than the thermal decomposition temperature, and therefore enables stable continuous production. The monomer composition ratio of the P3HA-based resin can be determined by gas chromatography or the like (see International Publication No. WO 2014/020838, for example).

Preferably, the resin composition contains, as the P3HA-based resin, a homopolymer constituted by a 3HB unit or a poly(3-hydroxybutyrate)-based resin, which is a copolymer of a 3HB unit and another hydroxyalkanoate unit. Examples of the poly(3-hydroxybutyrate)-based resin include poly(3-hydroxybutyrate) (P3HB), poly(3-hydroxybutyrate-co-3-hydroxyvalerate) (P3HB3HV), poly(3-hydroxybutyrate-co-3-hydroxyhexanoate) (P3HB3HH), poly(3-hydroxybutyrate-co-3-hydroxyvalerate-co-3-hydroxyhexanoate) (P3HB3HV3HH), poly(3-hydroxybutyrate-co-4-hydroxybutyrate) (P3HB4HB), poly(3-hydroxybutyrate-co-3-hydroxyoctanoate), and poly(3-hydroxybutyrate-co-3-hydroxydecanoate).

P3HA-based resins produced by microorganisms (microbial P3HA-based resins) are a P3HA-based resin that is normally constituted only by a polyhydroxyalkanoic acid monomer unit of the D-configuration (R-configuration). Among the microbial P3HA-based resins, P3HB, P3HB3HH, P3HB3HV, P3HB3HV3HH, and P3HB4HB preferable, and P3HB, P3HB3HH, P3HB3HV, P3HB4HB are more preferable, from the viewpoint of ease of industrial production.

The microorganisms that produce the microbial P3HB-based resin are not limited to any particular one, provided that the microorganisms are capable of producing the P3HA-based resins. For example, the first P3HB-producing bacteria discovered was *Bacillus megaterium* (discovered in 1925), and other examples of the P3HB-producing bacteria include natural microorganisms such as *Cupriavidus necator* (previously classified as *Alcaligenes eutrophus*), *Ralstonia eutropha*, and *Alcaligenes latus*. These microorganisms are known to accumulate P3HB within bacterial cells of the microorganisms.

Known bacteria that produce a copolymer of hydroxybutyrate and another hydroxyalkanoate include *Aeromonas caviae*, which is a bacterium capable of producing P3HB3HV and P3HB3HH, and *Alcaligenes eutrophus*, which is a bacterium capable of producing P3HB4HB. Particularly, regarding P3HB3HH, *Alcaligenes eutrophus* AC32 (FERM BP-6038) (T. Fukui, Y. Doi, J. Bateriol., 179, pp. 4821-4830 (1997)), into which genes of P3HA-based resin synthetases have been introduced in order to increase P3HB3HH productivity, is more preferable, for example. Bacterial cells of these microorganisms which have been cultured under appropriate conditions to accumulate P3HB3HH in the bacterial cells are used. In addition to the above, depending on the P3HA-based resins to be produced, genetically modified microorganisms into which various genes associated with synthesis of the P3HA-based resins have been introduced can be used, and culture conditions including substrate type can be optimized.

A molecular weight of the P3HA-based resin is not limited to any particular one, provided that it exhibits substantially sufficient physical properties for the intended use. A weight average molecular weight range of the P3HA-based resin is preferably 100,000 to 1,000,000, more preferably 150,000 to 700,000, even more preferably 200,000 to 500,000, and particularly preferably 250,000 to 450,000. With a weight average molecular weight of not less than 100,000, it is possible to achieve appropriate mechanical strength. Meanwhile, with a molecular weight of not more than 1,000,000, it is possible to reduce increase in melt viscosity, thereby providing superior moldability.

A method of determining the weight average molecular weight is carried out with use of gel permeation chromatography (GPC) ("Shodex GPC-101" available from Showa Denko K.K.). That is, a polystyrene gel ("Shodex K-804" available from Showa Denko K.K.) can be used for a column and chloroform can be used for a mobile phase. A weight average molecular weight may be determined as a molecular weight in terms of polystyrene. At this time, a calibration curve is made by using polystyrene with a weight average molecular weight of 31,400, 197,000, 668,000, and 1,920, 000. As a column for the GPC, any column appropriate for determining the molecular weight may be used.

(Other Resins)

The resin composition in the present manufacturing method may contain, in addition to the P3HA-based resin, a second P3HA-based resin. The second P3HA-based resin contains at least one kind of copolymer of a 3HB unit and another hydroxyalkanoate unit. The 3HB unit in the poly(3-hydroxyalkanoate)-based resin is preferably 65.0 mol to 90.0 mol, more preferably 68.0 mol to 88.0 mol, and even more preferably 70.0 mol to 85.0 mol. The resin composition further containing the second P3HA-based resin provides a molded article having excellent toughness.

The second P3HA-based resin is not limited to any particular one, provided that it differs from the P3HA-based resin. Examples of the second P3HA-based resin may include resins mentioned above as the examples of the P3HA-based resin.

There is no particular limitation on a content of the second P3HA-based resin. The content of the second P3HA-based resin is preferably not more than 50 parts by weight, more preferably not more than 45 parts by weight, and even more preferably not more than 40 parts by weight, with respect to 100 parts by weight of the total P3HA-based resin. There is no particular limitation on a lower limit of the content of the second P3HA-based resin. The lower limit may be 0 part by weight. As the second P3HA-based resin, the P3HA-based resin described above can be used. The "total P3HA-based resin" herein means all P3HA-based resins contained in the resin composition in accordance with the present manufacturing method.

The resin composition may contain another resin other than the P3HA-based resins to an extent that the another resin does not impair the advantageous effects of the present invention. Examples of such another resin may include: aliphatic polyester-based resins such as a polybutylene succinate adipate, a polybutylene succinate, a polycaprolactone, and a polylactic acid; and aliphatic aromatic polyester-based resins as a polybutylene adipate terephthalate, a polybutylene sebatate terephthalate, and a polybutylene azelate terephthalate. The another resin may include only one kind of resin, or may include two or more kinds of resins.

There is no particular limitation on a content of the another resin. The content of the another resin is preferably not more than 50 parts by weight and more preferably not more than 40 parts by weight, with respect to 100 parts by weight of the total P3HA-based resin. Even more preferably, the content is not more than 30 parts by weight. There is no particular limitation on a lower limit of the content of the another resin, and the lower limit may be 0 part by weight.

(Inorganic Filler)

It is preferable that the resin composition further contain an inorganic filler. The resin composition containing the inorganic filler achieves the effects of increased crystallization speed, decreased flash, improved productivity, and the like.

There is no particular limitation on the inorganic filler. Examples of the inorganic filler include talc, calcium carbonate, mica, silica, glass fibers, and glass particles.

A content of the inorganic filler is, for example, more than 0 part by weight and not more than 60 parts by weight, preferably 5 parts by weight to 50 parts by weight, more preferably 10 parts by weight to 40 parts by weight, and particularly preferably 15 parts by weight to 35 parts by weight, with respect to 100 parts by weight of the total P3HA-based resin. Setting the content of the inorganic filler so as to fall within the above range can provide both a sufficient crystallization speed and toughness.

The resin composition may also contain an additive that is usable together with the P3HA-based resin, provided that the advantageous effects of the present invention are not impaired. Examples of such an additive may include: coloring agents such as pigments and dyes; deodorizing agents such as activated carbon and zeolite; perfumes such as vanillin and dextrin; plasticizers; antioxidants; antioxidative agents; weather resistance improving agents; ultraviolet ray absorbing agents; crystal nucleating agents; lubricants; mold releases; water repellent agents; antibacterial agents; and slidability improving agents. Contained as the additive may be only one kind of additive. Alternatively, two or more kinds of additives may be contained as the additive. A content of the additive(s) can be set by a person skilled in the art as appropriate according to the purpose of use.

(Injection-Molded Product)

A maximum thickness of flash generated in an injection-molded product obtained by the present manufacturing method is preferably not more than 80 μm, more preferably not more than 70 μm, and further preferably not more than 60 μm. The lower the maximum thickness of the generated flash is, the better it is. Although there is no particular limitation on a lower limit of the maximum thickness, the lower limit of the maximum thickness is, for example, not less than 5 μm. A maximum flash thickness of the injection-molded product can be measured by a method described in the later-presented examples.

The present invention is not limited to the embodiments, but can be altered by a skilled person in the art within the scope of the claims. The present invention also encompasses, in its technical scope, any embodiment derived by combining technical means disclosed in differing embodiments.

That is, embodiments of the present invention are as follows.

<1> A method for manufacturing, with use of a mold apparatus, an injection-molded product of a resin composition containing a poly(3-hydroxyalkanoate)-based resin, the mold apparatus including a mold which has a parting line being in contact with a cavity in the mold and having a maximum width which is not more than 50 μm when the mold is closed, the method including the step of:

before filling the mold with the resin composition by injection, carrying out pressure reduction by reducing a gage pressure inside the cavity of the mold so as to be not more than −0.02 MPa.

<2> The method described in <1>, wherein:

the mold in the mold apparatus has the parting line being in contact with the cavity in the mold and having the maximum width which is not more than 30 μm when the mold is closed.

<3> The method described in <1> or <2>, wherein:

a vent portion is provided at a position in the mold which position is different from a position of the parting line being in contact with the cavity, the vent portion having an opening whose maximum width is 1 μm to 50 μm.

<4> The method described in any one of <1> to <3>, wherein:

the resin composition contains a poly(3-hydroxybutyrate)-based resin.

<5> The method described in <1> to <4>, wherein:
the poly(3-hydroxyalkanoate)-based resin contains at least one kind of copolymer of a 3-hydroxybutyrate unit and another hydroxyalkanoate unit; and
the 3-hydroxybutyrate unit in the poly(3-hydroxyalkanoate)-based resin is 94.5 mol % to 98.5 mol % with respect to 100 mol % of total repeating units.

<6> The method described in any one of <1> to <5>, wherein:
a thickness of flash generated in the injection-molded product is not more than 80 μm.

<7> The method described in any one of <1> to <6>, wherein:
in the step of carrying out the pressure reduction, the pressure reduction is carried out via an ejection pin and/or a vent portion.

<8> The method described in any one of <1> to <7>, wherein:
the resin composition further contains an inorganic filler.

<9> The method described in <8>, wherein:
a content of the inorganic filler in the resin composition is more than 0 part by weight and not more than 60 parts by weight.

EXAMPLES

The following description will discuss embodiments of the present invention in further detail on the basis of Examples. Note, however, that the present invention is not limited to Examples.

Materials

In Examples and Comparative Examples, the materials shown in Table 1 were used.

TABLE 1

| Classification | Abbreviation | Product name | Contents | Manufacturer |
|---|---|---|---|---|
| P3HA | PHA-L | PHBH4203 | PHBH, 3HB = 98.2 mol %, Mw = 350,000 | Kaneka Corporation |
|  | PHA-M | PHBH4303 | PHBH, 3HB unit = 94.1 mol %, Mw = 350,000 | Kaneka Corporation |
| Nucleating agent | PETL | Noilizer P | Pentaerythritol | Nihon Gosei Kako Co. Ltd. |
| Lubricant | BA | BNT-22H | Behenic acid amide | Nippon Fine Chemical Co. Ltd. |
| Inorganic filler | TALC | MICRO ACE K1 | Talc | Nippon Talc Co. Ltd. |

PHBH: Poly(3-hydroxybutyrate-co-3-hydroxyhexanoate)
3HH: 3-hydroxyhexanoate
3HB: 3-hydroxybutyrate
Mw: Weight-average molecular weight calculated in terms of polystyrene

[Measuring Method and Evaluating Method]
In Examples and Comparative Examples, determination and evaluation were carried out by the following method.
(Flash Thickness)
Spoons obtained at 100th shot, 200th shot, 300th shot, 400th shot, and 500th shot in injection molding were collected. Then, the spoons were observed by a microscope at 400× magnification. For a spoon with the largest flash, a maximum flash thickness was measured by software in the microscope. If the maximum flash thickness was not more than 80 μm, it was determined that the flash thickness was sufficiently small.
(Continuous Productivity)
The mold was washed with 99.5% ethanol, and thereafter molded products obtained at first 10 shots were discarded in order to make the molded products stable in shape. Then, the number of shots carried out until shortshot occurs was evaluated as continuous productivity. The number of shots more than 1000 was determined as sufficient continuous productivity.

Examples 1 to 6 and Comparative Examples 1 and 2

Injection-molded products in accordance with Examples 1 to 6 and Comparative Examines 1 and 2 were manufactured in the following manner. First, pellets of compounds R1 to R4 were obtained in the following manner.
(Preparation of PHBH Blend)
For the compounds R1 to R4, feeding amounts Ce (kg) of raw materials were determined according to the following formula (1), on the basis of "We" and "Wt". "We" denotes an added amount of each raw material for a PHBH blend (shown in Table 2), expressed in terms of parts per hundred. "Wt" denotes a total added amount of the PHBH blend, expressed in terms of parts per hundred.

$$Ce = 10 \times We/Wt \qquad (1)$$

The measured raw materials were fed into a 75 L super mixer (available from Kawata Mfk. Co., Ltd.), and were mixed at 300 rpm for 3 minutes, to obtain a PHBH blend.
(Pelletization)
TEM26SS (L/D=60, available from Toshiba Machine) was used. A barrel temperature was set at 140° C. and a screw speed was set at 100 rpm. A feed rate F1 (kg/hr) for the PHBH blend at the screw root was determined according to the following formula (2). A feed rate F2 (kg/hr) for the inorganic filler at the side feed was determined according to the following formula (3). The determination of the feed rates were carried out on the basis of "Wt" and "Wf". "Wt" denotes a total added amount of the PHBH blend, expressed in terms of parts per hundred. "Wf" denotes an added amount of the inorganic filler, expressed in terms of parts per hundred.

$$F1 = 10 \times Wt/(Wt + Wf) \qquad (2)$$

$$F2 = 10 \times Wf/(Wt + Wf) \qquad (3)$$

Strands from a dice were caused to pass through a bath filled with warm water at 45° C., so that the strands were hardened. Then, the strands thus hardened were cut with a pelletizer. In this manner, pellets of the compounds R1 to R4 were obtained.

TABLE 2

| Blend name | Abbreviation of raw material | Compound name | | | |
| --- | --- | --- | --- | --- | --- |
| | | R1 | R2 | R3 | R4 |
| Amount to be added (parts by weight) PHBH blend | PHA-L | | | | 100 |
| | PHA-M | 100 | 100 | 100 | |
| | PETL | 1 | 1 | 1 | 1 |
| | BA | 0.5 | 0.5 | 0.5 | 0.5 |
| | Total added amount in terms of parts per hundred | 101.5 | 101.5 | 101.5 | 101.5 |
| Inorganic filler | TALC | | 20 | 30 | 20 |

(Preparation of Injection-Molded Product)

An injection molding machine Si-180V (available from Toyo Machinery and Metal) was used to obtain a spoon with a total length of 160 mm by injected molding. Table 3 shows compounds and structures of molds used in injection molding in Embodiments and in Comparative Examples. A temperature setting for the injection molding machine was as follows: manifold/nozzle/T1 (barrel 1)/T2 (barrel 2)/T3 (barrel 3)/T4 (barrel 4)/T5 (barrel 5)/mold were respectively set at 160 C.°/160 C.°/150 C.°/140 C.°/130 C.°/110 C.°/37 C.°. Further, a temperature of a hot gate was adjusted in a range from 160 C.° to 180 C.° so that a uniform flow length was obtained. Before starting injection, a pressure reducing step of reducing a gage pressure inside the cavity was carried out. The pressure reducing step was carried out by pulling an ejection pin of the mold to create a gap and reducing the gage pressure to a predetermined pressure. After the injection was started, the ejection pin was closed at a timing just before the injected resin reached the ejection pin. It should be noted that the gage pressure was controlled by a controller so as to be constant.

Results

For the injection-molded products obtained in Examples 1 to 6 and Comparative Examples 1 and 2, the flash thickness and the number of continuous production times were measured. The result thereof is shown in Table 3.

not carried out, the maximum flash thickness was smaller than 80 μm but shortshot occurred before the number of shots exceeded 1000.

The above results show that, by (a) using a specific mold (i.e., a mold which has a parting line being in contact with a cavity in the mold and having a maximum width which is not more than 50 μm when the mold is closed) and (b) carrying out the step of reducing a gage pressure inside the cavity, it is possible to carry out continuous production of stable injection-molded products without generating flash in the injection-molded products.

INDUSTRIAL APPLICABILITY

The present invention makes it possible to carry out stable continuous production without generating flash, and therefore is suitably applicable to the field of manufacturing an injection-molded product with use of a P3HA-based resin and other fields.

REFERENCE SIGNS LIST

1: mold (nested portion)
2: mold (body)
3: mold
10: mold apparatus
11: sprue
12: runner
13: gate
14: nozzle
21: parting line being in contact with cavity in mold

TABLE 3

| Item | Example 1 | Example 2 | Example 3 | Example 4 | Example 5 | Example 6 | Comparative Example 1 | Comparative Example 2 |
| --- | --- | --- | --- | --- | --- | --- | --- | --- |
| Compound name | R3 | R3 | R3 | R2 | R4 | R1 | R3 | R3 |
| Gage pressure (MPa) inside cavity just before start of injection | −0.08 | −0.08 | −0.05 | −0.08 | −0.08 | −0.08 | −0.08 | 0 |
| Maximum width (μm) of parting line | 5 | 20 | 5 | 5 | 5 | 5 | 60 | 5 |
| Maximum flash thickness (μm) | 18 | 58 | 48 | 34 | 15 | 47 | 135 | 72 |
| The number of continous production times (shot) | >1000 | >1000 | >1000 | >1000 | >1000 | >1000 | >1000 | 371 |

Table 3 indicates that, in each of Examples 1 to 6, the maximum flash thickness was sufficiently small and continuous productivity was excellent. Meanwhile, in Comparative Example 1, in which the parting line being in contact with the cavity was larger than 50 μm, the maximum flash thickness was larger than 80 μm. Further, in Comparative Example 2, in which the pressure reduction in the cavity was 31: cavity
41: vent portion
42: slit
51: ejection pin
61: injection molding machine
71: pressure reducing portion

The invention claimed is:

1. A method for manufacturing an injection-molded product of a resin composition comprising a poly(3-hydroxyalkanoate)-based resin, using a mold apparatus comprising a mold, the method comprising:

carrying out pressure reduction by reducing a gage pressure inside a cavity of the mold such that the gage pressure is −0.02 MPa or less, and filling the mold with the resin composition by injection, wherein the mold has a parting line being in contact with the cavity in the mold, and the parting line has a maximum width of 50 μm or less when the mold is closed.

2. The method according to claim 1, wherein the parting line has the maximum width of 30 μm or less when the mold is closed.

3. The method according to claim 1, wherein a vent portion is provided at a position in the mold which position is different from a position of the parting line being in contact with the cavity, and the vent portion has an opening having a maximum width of from 1 μm to 50 μm.

4. The method according to claim 1, wherein the resin composition comprises a poly(3-hydroxybutyrate)-based resin.

5. The method according to claim 1, wherein the poly(3-hydroxyalkanoate)-based resin comprises a copolymer of a 3-hydroxybutyrate unit and another hydroxyalkanoate unit; and a content of the 3-hydroxybutyrate unit in the poly(3-hydroxyalkanoate)-based resin is from 94.5 mol % to 98.5 mol % based on 100 mol % of total repeating units.

6. The method according to claim 1, wherein a thickness of flash generated in the injection-molded product is 80 μm or less.

7. The method according to claim 1, wherein in the carrying out the pressure reduction, the pressure reduction is carried out via an ejection pin, a vent portion, or a combination thereof.

8. The method according to claim 1, wherein the resin composition further comprises an inorganic filler.

9. The method according to claim 8, wherein a content of the inorganic filler in the resin composition is from more than 0 part by weight to 60 parts by weight.

10. The method according to claim 1, wherein the parting line has the maximum width of 20 μm or less when the mold is closed.

11. The method according to claim 3, wherein the maximum width of the opening of the vent portion is from 2 μm to 40 μm.

12. The method according to claim 3, wherein the maximum width of the opening of the vent portion is from 3 μm to 30 μm.

13. The method according to claim 3, wherein the opening of the vent portion has at least one type of structure selected from the group consisting of a slit type, a porous type, a nested type, and an opening/closing type.

14. The method according to claim 1, wherein the gage pressure is −0.03 MPa or less.

15. The method according to claim 1, wherein the gage pressure is −0.05 MPa or less.

16. The method according to claim 5, wherein the content of the 3-hydroxybutyrate unit in the poly(3-hydroxyalkanoate)-based resin is from 95.0 mol % to 98.5 mol % based on 100 mol % of total repeating units.

17. The method according to claim 5, wherein the content of the 3-hydroxybutyrate unit in the poly(3-hydroxyalkanoate)-based resin is from 96.0 mol % to 98.5 mol %.

18. The method according to claim 5, wherein the content of the 3-hydroxybutyrate unit in the poly(3-hydroxyalkanoate)-based resin is from 96.5 mol % to 98.0 mol %.

19. The method according to claim 8, wherein a content of the inorganic filler in the resin composition is from 5 part by weight to 50 parts by weight.

20. The method according to claim 8, wherein a content of the inorganic filler in the resin composition is from 10 part by weight to 40 parts by weight.

* * * * *